United States Patent
Yang

(10) Patent No.: US 10,166,941 B1
(45) Date of Patent: Jan. 1, 2019

(54) LIGHT HOUSING FOR MOUNTING LIGHT ON BUMPER OF AUTOMOBILE

(71) Applicants: Warner Science Applications Corp., Ontario, CA (US); Paramount Automotive Restyling Inc., Ontario, CA (US)

(72) Inventor: Mingfa Yang, Calabasas, CA (US)

(73) Assignees: WARNER SCIENCE APPLICATIONS CORP., Ontario, CA (US); PARAMOUNT AUTOMOTIVE RESTYLING INC., Ontario, CA (US)

(*) Notice: Subject to any disclaimer, the term of this patent is extended or adjusted under 35 U.S.C. 154(b) by 0 days.

(21) Appl. No.: 15/860,550

(22) Filed: Jan. 2, 2018

(51) Int. Cl.
*B60Q 1/00* (2006.01)
*B60R 19/50* (2006.01)
*B60Q 1/26* (2006.01)

(52) U.S. Cl.
CPC .............. *B60R 19/50* (2013.01); *B60Q 1/26* (2013.01); *B60R 2019/505* (2013.01)

(58) Field of Classification Search
CPC ...... B60Q 1/20; B60Q 1/0483; B60Q 1/0441; B60Q 1/0683; B60Q 1/0052; B60Q 1/323; F21V 14/06; F21V 21/30; F21V 13/04; F21V 14/04; F21V 23/045; F21V 9/30
USPC ....................................................... 362/505
See application file for complete search history.

(56) References Cited

U.S. PATENT DOCUMENTS

| | | | | |
|---|---|---|---|---|
| 5,715,541 A | * | 2/1998 | Landau | A41D 13/05 2/410 |
| 5,909,955 A | * | 6/1999 | Roorda | F21S 8/04 362/368 |
| 6,079,852 A | * | 6/2000 | Kamaya | B60Q 1/0483 362/287 |
| 7,748,678 B2 | * | 7/2010 | Camarota | B60N 3/101 224/926 |
| 2005/0237730 A1 | * | 10/2005 | Barnes | B60Q 1/32 362/34 |
| 2008/0186697 A1 | * | 8/2008 | Camarota | B60N 3/101 362/101 |
| 2013/0182453 A1 | * | 7/2013 | Masuda | G02B 6/0096 362/511 |

\* cited by examiner

*Primary Examiner* — Thien M Le
(74) *Attorney, Agent, or Firm* — Chen Yoshimura LLP

(57) ABSTRACT

A light housing for installing a light on a bumper of an automobile. It includes a cylindrical member with a front opening which has a shape defined by an intersection of the cylinder with a first plane that is non-perpendicular to a cylindrical axis of the cylinder, and an oval shaped mounting ring joined to the cylindrical member at the front opening. The mounting ring had a backward extending outer rim, the outer rim having a shape that conforms to a second plane which is parallel to the first plane. When mounted on the bumper, the backward extending outer rim presses against the bumper surface. The light housing is designed such that when mounted, the axial direction of the cylindrical member forms a predefined angle relative to the forward direction of the automobile, e.g. parallel to the forward direction.

3 Claims, 1 Drawing Sheet

LIGHT HOUSING FOR MOUNTING LIGHT ON BUMPER OF AUTOMOBILE

BACKGROUND OF THE INVENTION

This invention relates to automobile parts, and in particular, it relates to a light housing for mounting a light onto a bumper of an automobile.

SUMMARY

Embodiments of the present invention provides a light housing adapted to be installed on a bumper of an automobile, which includes: a cylindrical member having a shape of a cylinder, with a front opening which has a shape defined by an intersection of the cylinder with a first plane that is non-perpendicular to a cylindrical axis of the cylinder; and a mounting ring joined to the cylindrical member at the front opening, the mounting ring having an oval shape as view in a direction perpendicular to the first plane, the mounting ring having an outer rim which is located outside of the cylindrical member and extends toward a back end of the cylindrical member, the outer rim having a shape that conforms to a second plane which is parallel to the first plane.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
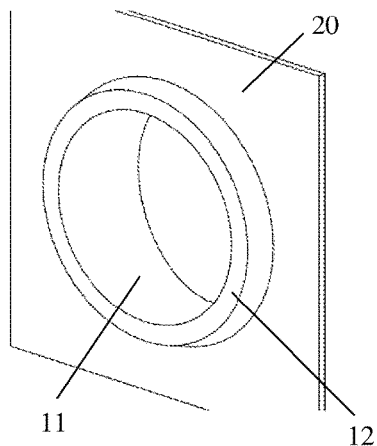
FIG. 1 is a front perspective view of a light housing mounted on a bumper of an automobile according to an embodiment of the present invention.
Figure 2:
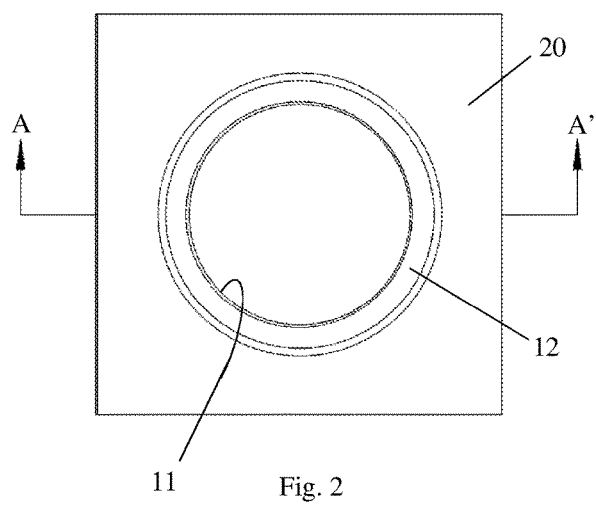
FIG. 2 is a front view of the light housing mounted on the bumper.
Figure 3:
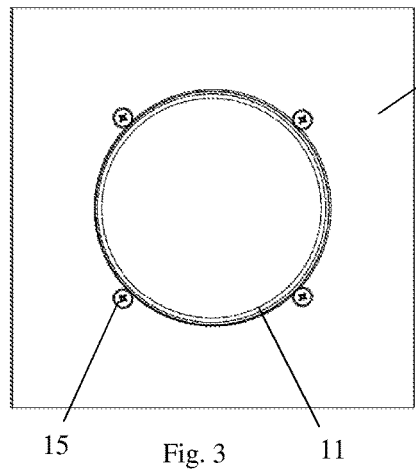
FIG. 3 is a rear view of the light housing mounted on the bumper.
Figure 4:
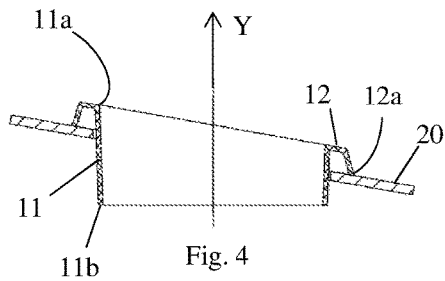
FIG. 4 is a cross-sectional view of the light housing and the bumper viewed in the direction A-A' of FIG. 2.

The light housing described herein is for mounting a light on the bumper of an automobile such as cars or trucks.

The outer surface of a bumper at the mounting location is not necessarily perpendicular to the horizontal "forward" direction of the automobile. The light housing according to embodiments of the present invention is designed to mount the light such that the optical axis of the light has a predefined direction, for example a direction parallel to the forward direction of the automobile.

As shown in FIGS. 1-4, the light housing includes a cylindrical member 11 and a mounting ring 12, and is preferably formed integrally of a plastic material. The cylindrical member 11 is adapted for accommodating a light. The mounting ring 12 is joined to the cylindrical member 11 around its front opening 11a. The geometric shape of the front opening 11a of the cylindrical member 11 is defined by the intersection of the cylinder and a plane that is non-perpendicular to the cylindrical axis Y. In some embodiments, the angle between the cylindrical axis Y and the plane is between 5-15 degrees, for example about 10 degrees.

Thus, the shape of the front opening 11a is circular when viewed in the direction parallel to the cylindrical axis, and an oval when viewed in a direction perpendicular to the plane. The mounting ring 12 also has an oval shape when viewed in a direction perpendicular to the plane.

The outer rim 12a of the ring 12, which faces backwards, i.e. toward the back end 11b of the cylindrical member 11, has a shape that matches the surface shape of the bumper at the location where the light housing is intended to be mounted. In some embodiments, the outer rim 12a conforms to a second plane, the second plane being parallel to the first plane that defines the front opening 11a. This is suitable when the bumper is relatively flat (i.e. approximately a plane) at the mounting location. In the cross-sectional view, the shape of the mounting ring 12 may be any suitable shape. In the illustrated embodiment (see FIG. 4), the mounting ring 12 includes a flange that extends outwardly in the first plane from the front opening 11a, and a sleeve that extends backwardly from the outer edge of the flange. In other embodiments (not shown), the cross-sectional shape of the mounting ring 12 may be a smooth curve. When mounted on the plate 20 of the bumper, the backward facing rim 12a presses against the bumper plate 20. The light housing is designed for a bumper surface location that has a known orientation relative to the forward direction of the automobile, so that the axial direction Y of the cylindrical member 11 and the second plane of the backward facing rim 12a have a defined non-perpendicular relationship such that when the light housing is mounted on the bumper, the axial direction Y is parallel to the forward direction of the automobile. If desired, the light housing can also be designed such that the axial direction Y forms a predefined angle relative to the forward direction of the automobile.

Figure 5:
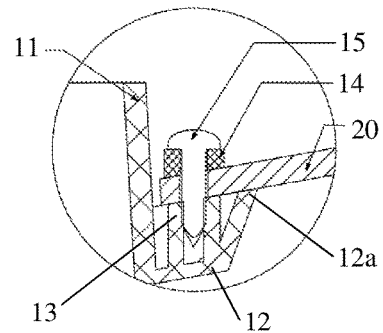
FIG. 5 is an enlarged view showing details of a portion of the light housing.

FIG. 5 is an enlarged cross-sectional view showing a part of the light housing, where a screw 15 is used to affix the mounting ring 12 to the bumper plate 20. The screw 15 passes through the bumper plate 20 an engages a portion of the mounting ring 12. In the illustrated embodiment, the screws 15 is oriented in parallel to the axial direction of the cylindrical member 11. Preferably, a beveled ring gasket 14 is used between the screw 15 and the bumper plate 20 to compensate for the fact that the underside of the screw head is non-parallel to the bumper plate 20. In the illustrated embodiment, a screw receiving structure 13 with a pre-formed hole may be provided on the back side of the mounting ring 12, located between the cylindrical member 11 and the outer rim 12a, to receive the screws 15. As seen in the FIG. 3 (rear view), multiple screws 15 are used, and they are located outside of the cylindrical member 11.

To install the light housing, a round opening is formed in the bumper plate 20, the cylindrical member 11 of the light housing is inserted from the front through the opening, and the screws are used on the back side of the bumper plate 20 to affix the light housing to the bumper. The light can then be installed in the light housing.

Some advantages of the light housing are as follows. Conventionally, to mount a light on the bumper, a hole is simply cut into the bumper, and the light is directly mounted on the bumper, with the mounting holes exposing the front of the light. Without using a light housing described in this disclosure, the edge of the mounting hole can often be visible. This can be unsightly, as the imperfections in the cutting can be visible, and the mounting brackets used for mounting the lights to the bumper, located behind the hole, can also be visible. By using the light housing described in this disclosure, the gap between the edge of the hole and the light is covered. Further, the light housing may be made in different colors, which allows the user to configure the bumper to match other accessories such as the towing rings or headlight guards.

It will be apparent to those skilled in the art that various modification and variations can be made in the light housing method of the present invention without departing from the spirit or scope of the invention. Thus, it is intended that the present invention cover modifications and variations that come within the scope of the appended claims and their equivalents.

What is claimed is:

1. A light housing adapted to be installed on a bumper of an automobile, comprising:
    a cylindrical member, the cylindrical member defining an inner surface having a shape of a round cylinder, with a front opening which has a shape defined by an intersection of the inner surface with a first plane that is non-perpendicular to a cylindrical axis of the cylinder; and
    a mounting ring joined to the cylindrical member at the front opening, the mounting ring having an oval shape as view in a direction perpendicular to the first plane, the mounting ring having an outer rim which is located outside of the cylindrical member and extends toward a back end of the cylindrical member, the outer rim having a shape that conforms to a second plane which is parallel to the first plane.

2. The light housing of claim 1, wherein the mounting ring includes a plurality of screw receiving structures have pre-formed holes, located between the cylindrical member and the outer rim.

3. The light housing of claim 1, wherein the cylindrical member and the mounting ring are formed integrally of a plastic material.

* * * * *